E. R. BAILEY AND W. A. McGUIRE.
PIPE BENDING MECHANISM.
APPLICATION FILED NOV. 10, 1919.
1,333,369.
Patented Mar. 9, 1920.
3 SHEETS—SHEET 2.
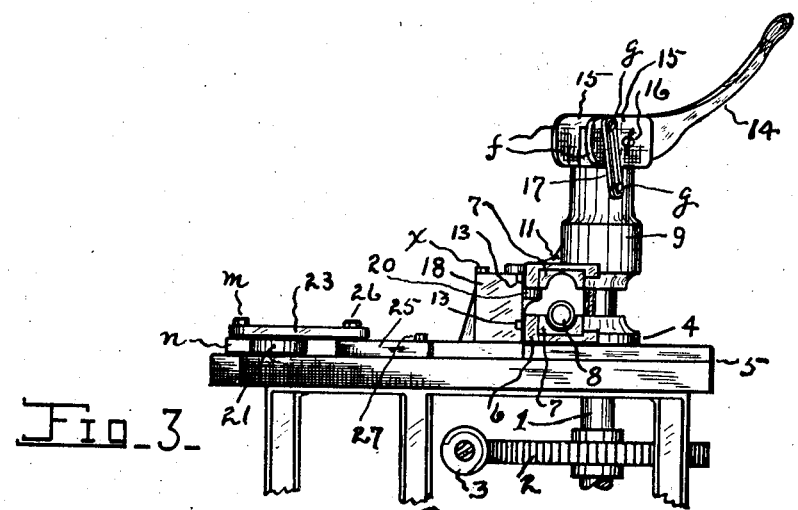
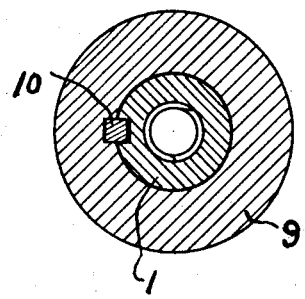
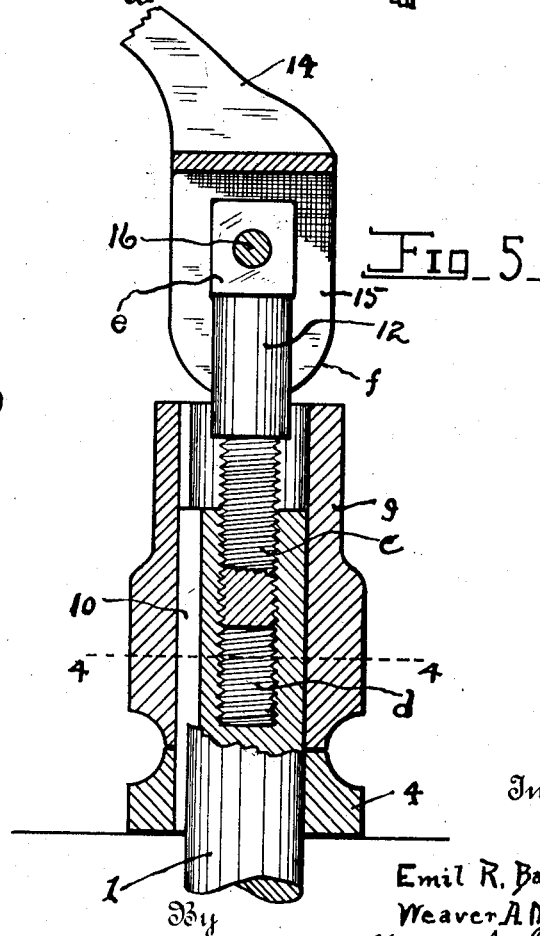
Inventors
Emil R. Bailey and
Weaver A. McGuire,
Hiram A. Sturges,
Attorney

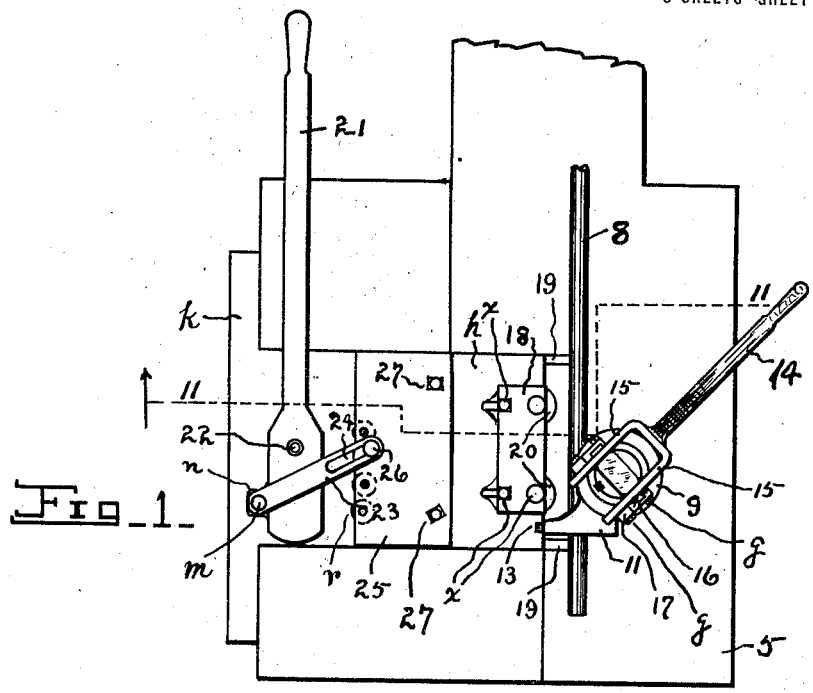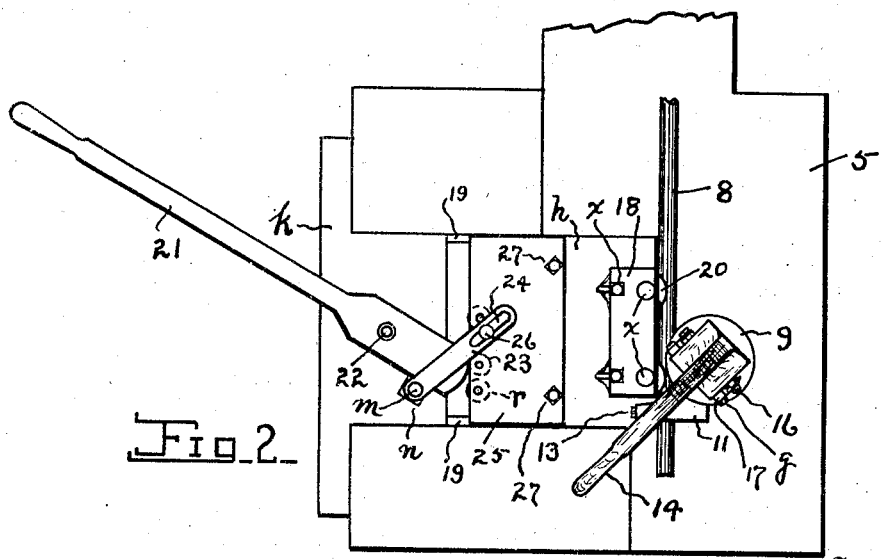

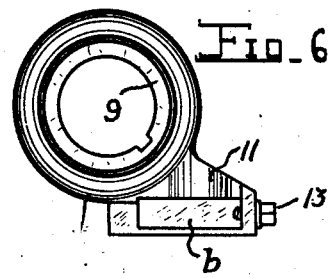
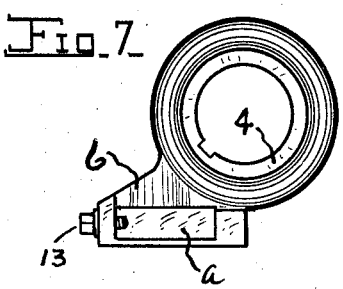
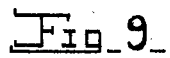
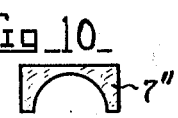
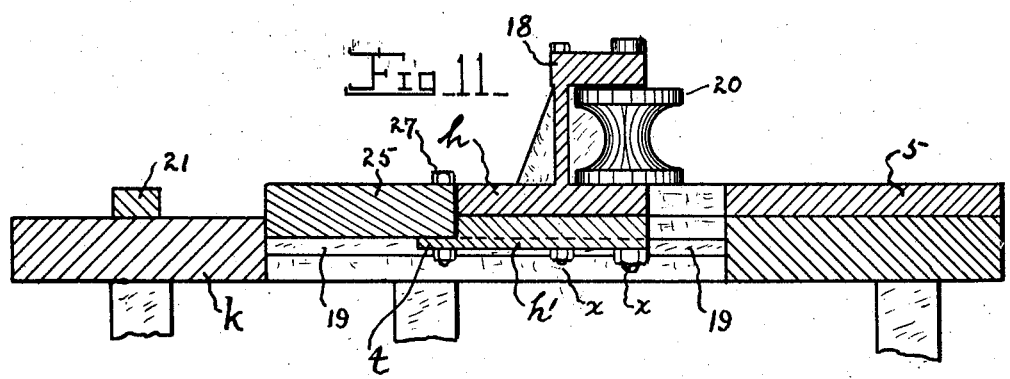
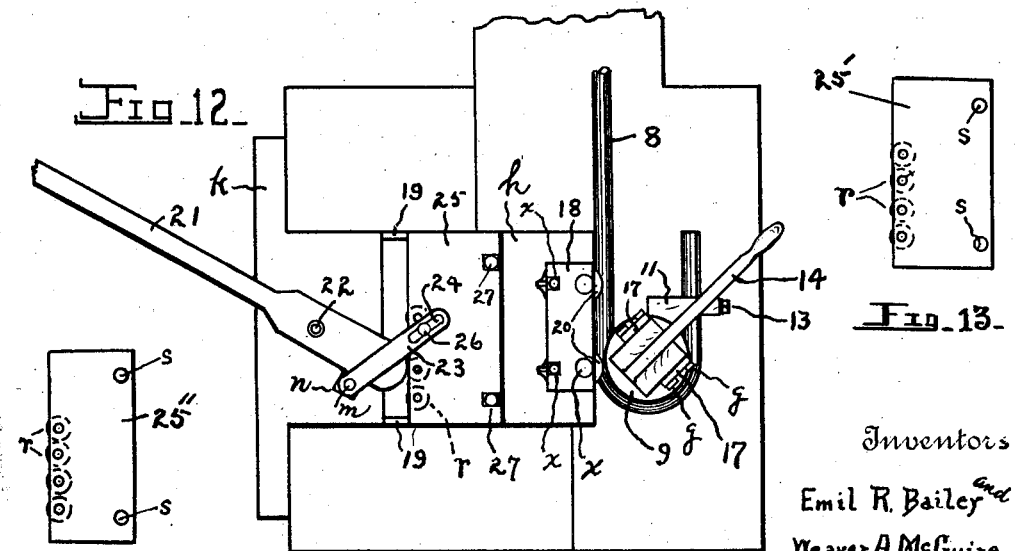

UNITED STATES PATENT OFFICE.

EMIL R. BAILEY AND WEAVER A. McGUIRE, OF OMAHA, NEBRASKA.

PIPE-BENDING MECHANISM.

1,333,369. Specification of Letters Patent. Patented Mar. 9, 1920.

Application filed November 10, 1919. Serial No. 336,787.

*To all whom it may concern:*

Be it known that we, EMIL R. BAILEY and WEAVER A. McGUIRE, citizens of the United States, residing at Omaha, in the county of Douglas and State of Nebraska, have invented certain new and useful Improvements in Pipe-Bending Mechanism, of which the following is a specification.

This invention relates to an improvement in pipe-bending mechanism, and has for its object to provide means whereby pipes of various diameters may be held more firmly and may be bent more quickly than ordinary. The invention also includes means for making certain adjustments so that pipe differing in diameters may be bent.

The invention consists of the novel construction, combination and arrangement of parts as described herein and claimed, and as illustrated in the accompanying drawing, wherein—

Figure 1 is a plan view of the pipe-bending mechanism, showing the clamping devices disengaged from the pipe. Fig. 2 is a similiar view to that shown in Fig. 1, the clamping devices being in engagement with a pipe. Fig. 3 is a view in side elevation of the parts shown in Fig. 1, the table-legs being broken away. Fig. 4 is a transverse section through the movable sleeve on line 4—4 of Fig. 5. Fig. 5 is a sectional view showing the slidable mounting for the sleeve upon the revoluble shaft of the device, the hand-lever being broken away. Fig. 6 is a bottom plan view of the sleeve. Fig. 7 is a top plan view of a base-ring. Figs. 8, 9 and 10 are side views of concaved contact-plates. Fig. 11 is a sectional view through the table on line 11—11 of Fig. 1. Fig. 12 is a plan view of the table showing position of parts when a pipe has been bent. Figs. 13 and 14 are plan views of adjusting plates employed.

Referring now to the drawing for a more particular description, the invention is shown and described in connection with the conventional, revoluble, vertical shaft of a pipe-bending machine, said shaft having suitable bearings, and usually being provided with a gear-wheel 2 in engagement with a revoluble worm-gear 3, so arranged that the shaft will have reciprocatory rotary motion, its arc of movement being approximately a half circle, for bending a pipe. The parts thus mentioned for a pipe-bending machine are so well known that a description of the means for causing reciprocatory rotation of the vertical shaft 1 is not considered to be necessary.

For purposes of the invention we provide a pipe-supporting base-ring 4 which encircles and is splined on the shaft and is disposed upon a table 5, said base having an arm 6 projecting outwardly and provided with a recess $a$, said recess being rectangular in plan for receiving a concaved contact-plate 7, or one of the concaved contact-plates 7' or 7'', as may be required, and depending upon the diameter of a pipe 8 to be bent.

At 9 is indicated a sleeve which is mounted slidably upon the shaft, and on account of a key or spline 10 it is adapted to rotate with said shaft, the sleeve being provided with an arm 11 projecting outwardly from its lower end, having a rectangular recess $b$ for receiving one of the contact-plates 7, 7' or 7'', set-screws 13 or equivalent members being employed for removably securing the contact-plates within the recesses.

At 12 is indicated a shaft-extension for the shaft 1, which, as best shown in Fig. 5, has a threaded terminal $c$ adapted to be mounted in the threaded aperture $d$ which is formed within and which opens on the upper end of said shaft 1; and at 14 is indicated a hand-lever provided with a pair of adjacently disposed jaws 15 at its inner end, said jaws having a pivotal mounting upon a pin 16 which is disposed in suitable apertures formed in the head $e$ of the shaft-extension 12, said jaws also having uniformly curved contact-faces $f$ disposed non-concentric with the pivot-pin 16.

Numerals 17 indicate slotted coupling-plates which are disposed at the sides of the jaws 15 which normally prevent any rotatable movement of the shaft-extension 12 independently of the sleeve 9, bolts or keepers $g$ being arranged in pairs and secured to the jaws 15 and to opposed sides of the sleeve and engaging in the slots of the coupling-plates. As thus described the sleeve 9 will be under control of the hand-lever 14 to cause said sleeve to slide downwardly to effect engagement of the plate 7 of the sleeve with a pipe 8, or to cause the sleeve to slide upwardly to the position shown in Fig. 3.

Numeral 18 indicates a spool-holding block having a base-plate $h$ formed integral therewith, a second base-plate $h'$ being disposed below and connected with the plate $h$ by means of bolts $x$, said plates being supported and adapted to have a movement in a direction of the sleeve or reversely, said support being upon a pair of ledges 19 which are provided for the table 5; and in order that the spools 20, which are mounted on a pair of bolts $x$, may be firmly pressed against a pipe 8, a second hand-lever 21 having a convexed terminal is provided, and is pivotally mounted as indicated at 22, between its ends, upon a stationary plate $k$ of the table. Numeral 23 indicates a link provided with a slot 24, one of its ends being mounted, as indicated at $m$ upon a projection $n$ which is provided for said lever, the opposite end of the link being mounted upon and midway between the ends of a rectangular spacing-plate 25, a bolt 26 being used for this mounting which engages in the slot of the link.

The plate 25, as well as the plates 25' and 25" shown in Figs. 13 and 14 are each provided at their outer edge with friction-rollers $r$ for engagement with the curved terminal of the lever 21 and are also provided near their inner edges with apertures $s$ for receiving bolts 27 for a removable connection with a flange $t$ (Fig. 11) of the plate $h'$, the adjusting-plates mentioned having different widths as compared with each other, and adapted to be substituted one for the other for adjusting the parts, so that the spools 20 may be disposed nearer to or farther from the sleeve 9, since pipes of greater diameter will require a greater space when they are placed between the sleeve and spools than pipes of lesser diameter.

The work of bending pipes by use of the herein described mechanism may be quickly and conveniently accomplished. A plate 25, 25' or 25" being first secured in the position mentioned, the particular plate selected depending upon the diameter of the pipe to be bent; and the plates 7, 7' or 7" being inserted in apertures $a$ and $b$, depending also upon the diameter of said pipe, the operator, by use of the lever 14 swung to the position shown in Figs. 1 or 3, will cause an upward slidable movement of the sleeve 9 to permit the pipe to be placed between the concaved contact-plates. The operator then swings the lever 14 approximately 90 degrees to the position shown in Figs. 2 and 5, that part of the curved surfaces $f$ farthest from the pivot-pin 16 being in engagement with the top of the sleeve for pressing the pipe between the contact-plates 7. The operator then, by use of the lever 21, moves the spools 20 into contact with one side of the pipe 8, after which the shaft 1 moves in an arc, approximately, of a half circle, the sleeve 9, base 4, and lever 14 moving therewith to the position of parts shown in Fig. 12.

It will be appreciated that rapidity in operation is a great advantage for bending pipes in instances where they may be bent only while maintained at a high degree of heat; also that while being bent the pipes must be firmly clamped or held, and it is considered that the present construction provides these advantages.

What we claim as new and desire to secure by Letters Patent is,—

1. In combination with the table and revoluble shaft of a pipe-bending machine, a pipe-supporting base-ring splined on the shaft and having an arm provided with a recess, a sleeve splined on the shaft and having an arm provided with a recess, contact-plates disposed in said recesses, each having a concaved part, a hand-lever having a pair of jaws pivotally mounted on the shaft and having curved bearing faces non-concentric with said pivotal mounting in engagement with the sleeve, coupling-plates connecting the sleeve with the jaws of the hand-lever, a spool-holder block on the table, a spacing-plate on the table removably connected with the spool-holder block, and a lever having a pivotal mounting between its ends on the table for moving the spacing-plate and spool-holding block.

2. In combination with the table and revoluble shaft of a pipe-bending machine, a pipe-supporting base-ring movable with the shaft and having an arm provided with a recess, a sleeve revoluble with the shaft and having an arm provided with a recess, contact-plates disposed in said recesses, a hand-lever having a pair of jaws pivotally mounted on the shaft and having curved parts non-concentric with said pivotal mounting for engaging the sleeve, coupling-plates connecting the sleeve with the jaws of the hand-lever, a spool-holder block on the table, a spacing-plate on the table removably connected with the spool-holder block and provided with rollers, a second hand-lever, said second lever having a convexed terminal and pivotally mounted between its ends on the table and arranged to have a swinging movement into engagement with the rollers for moving the spacing-plate and spool-holding block, and a slotted link pivotally connected with the second lever and having a pivotal mounting on the spacing-block.

In testimony whereof, we have affixed our signatures in presence of two witnesses.

EMIL R. BAILEY.
WEAVER A. McGUIRE.

Witnesses:
HIRAM A. STURGES,
GEORGE HEIMROD.